United States Patent
Redert et al.

(10) Patent No.: US 7,439,976 B2
(45) Date of Patent: Oct. 21, 2008

(54) VISUAL COMMUNICATION SIGNAL

(75) Inventors: Peter-Andre Redert, Eindhoven (NL); Fabian Edgar Ernst, Eindhoven (NL); Piotr Wilinski, Eindhoven (NL); Marc Joseph Rita Op De Beeck, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 697 days.

(21) Appl. No.: 10/478,734

(22) PCT Filed: May 28, 2002

(86) PCT No.: PCT/IB02/01912

§ 371 (c)(1),
(2), (4) Date: Nov. 24, 2003

(87) PCT Pub. No.: WO02/097733

PCT Pub. Date: Dec. 5, 2002

(65) Prior Publication Data

US 2004/0156631 A1    Aug. 12, 2004

(30) Foreign Application Priority Data

May 29, 2001 (EP) ................................ 01202034

(51) Int. Cl.
*G06T 15/10* (2006.01)
(52) U.S. Cl. .................... 345/427; 345/7; 345/28; 345/419; 382/128; 600/407
(58) Field of Classification Search ............... 345/418, 345/716, 726, 419, 427, 28; 382/128; 600/407
See application file for complete search history.

(56) References Cited

U.S. PATENT DOCUMENTS

| | | | |
|---|---|---|---|
| 5,638,499 A * | 6/1997 | O'Connor et al. | 345/630 |
| 6,411,725 B1 * | 6/2002 | Rhoads | 382/100 |
| 6,525,731 B1 * | 2/2003 | Suits et al. | 345/427 |
| 6,573,912 B1 * | 6/2003 | Suzuki et al. | 715/757 |
| 6,654,490 B2 * | 11/2003 | Love | 382/154 |
| 2003/0172131 A1 * | 9/2003 | Ao | 709/219 |

FOREIGN PATENT DOCUMENTS

EP   0793376   9/1997
FR   2786590   6/2000

* cited by examiner

*Primary Examiner*—Kimbinh T Nguyen

(57) ABSTRACT

Disclosed is a visual communication signal (32) which comprises image model information (10) for generating 3-D images. The image model information (10) may comprise a 3-D image model, e.g. a 3-D wireframe model or a 3-D voxel map. Some of the generated 3-D images may have a relatively low image quality. The visual communication signal (32) further comprises image enhancement information (20) corresponding to at least part of the 3-D images for enhancing the image quality of the generated 3-D images. This image enhancement information (20) may comprise image information corresponding to one or more single viewpoints (22, 24) and/or image information corresponding to one or more ranges of viewpoints (26, 28). The visual communication signal (32) may be transmitted from a transmitter (30) to a receiver (34) in a visual communication system (40) such as a 3-D television system or a 3-D teleconferencing system. Alternatively, the visual communication signal (32) may be carried by a tangible medium, e.g. a CD-ROM or a DVD-ROM.

18 Claims, 3 Drawing Sheets

VISUAL COMMUNICATION SIGNAL

Figure 1:
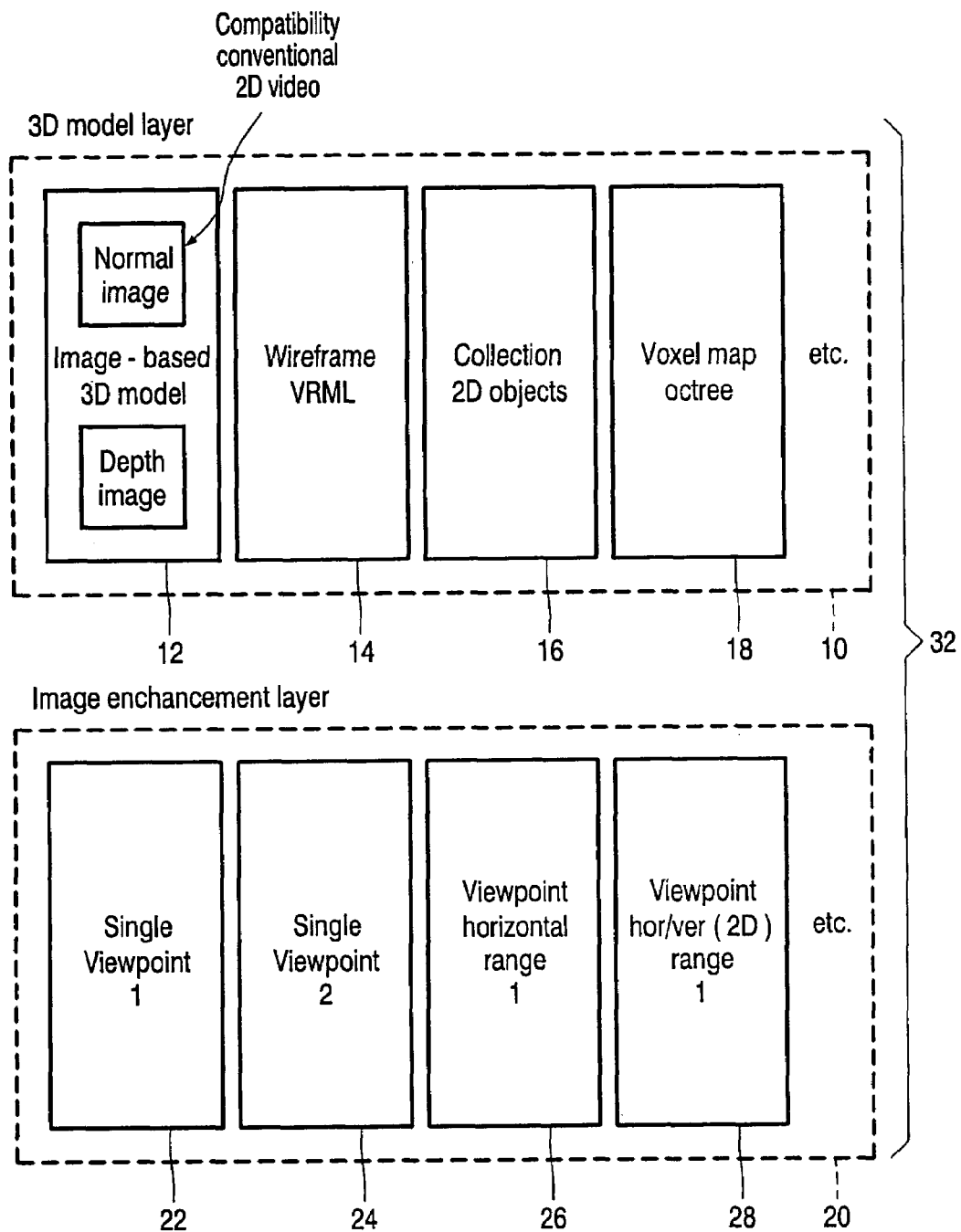

The invention relates to a visual communication signal comprising image model information for generating at least 3-D images.

The invention further relates to a visual communication system for transmitting such a visual communication signal from a transmitter to a receiver, to a transmitter for transmitting such a visual communication signal, to a receiver for receiving such a visual communication signal, to a method of transmitting such a visual communication signal and to a tangible medium for carrying such a visual communication signal.

A visual communication signal according to the preamble is known from the paper entitled "Hierarchical coding of light fields with disparity maps", by M. Magnor & B. Girod, Proceedings IEEE Conference ICIP99, Kobe, Japan, Vol. 3, pp 334-338, 1999.

Such visual communication signals are used in visual communication systems, e.g. three dimensional (3-D) television or teleconferencing systems, for transmitting 3-D video information from a transmitter to a receiver.

In visual communication systems, three dimensional video might be the next revolution after the introduction of colour. In an evolutionary scenario, it is important to find solutions that
 ensure compatibility with conventional monoscopic video;
 provide options for high-quality 3-D video right from start;
 and allow for continuous improvement over some years.

Currently, many different options are available for acquiring and displaying 3-D content, involving multiple cameras, range cameras, and high resolution displays with complex optics. Image and signal processing is needed to interface between devices with different modality (i.e. devices that support different datatypes), e.g. between a stereo camera and a multi-viewpoint display supporting more than two viewpoints. However, the state of the art in image and signal processing is nowhere near to enable interfacing of a large number of different 3-D acquisition and display devices. All current image processing techniques work only for opaque (non-transparent) objects, while still giving rise to many visible artefacts. When this problem is solved, it will still be a huge problem to handle transparency (smoke, fog, water, windows), specular emission/reflectivity (light sources, mirrors, metals) and high topological detail and dynamics (tree-leaves moving in the wind). Obviously, the high quality requirement vital to making 3-D a success, is not met in general.

In the visual communication signal known from the above mentioned paper the image model information is comprised in a hierarchically coded light field. Such a light field is based on a densely sampled set of 2-D images of a static scene, enabling easy data acquisition by means of a regularly spaced 2-D grid of cameras. A decoder can, on the basis of the coded light field, locally refine the light field by estimating disparity-compensated intermediate light-field images that were not originally recorded. These interpolated images can greatly enhance rendering performance. Nevertheless, some of these interpolated images still have a relatively low image quality due to rendering artefacts.

It is an object of the invention to provide a visual communication signal as described in the opening paragraph which enables the generation of 3-D images having a relatively high image quality. This object is achieved in the visual communication signal according to the invention, which visual communication signal is characterized in that the visual communication signal further comprises image enhancement information corresponding to at least part of the 3-D images. From the image model information, (3-D) images can be rendered from any arbitrary viewpoint. This ensures that at any time in the evolution scenario, any display can be used (monoscopic, stereoscopic, multiview displays). The image enhancement information ensures that a specific set of viewpoints, those that were originally recorded to generate the 3-D image model, can be rendered without artefacts.

The image model information (or 3-D model) is the result of the analysis processing of all or almost all data from the acquisition device. For example, a 50 camera acquisition device still results in a single 3-D model. As the latter in general contains fewer information bits, the 3-D model can be used for efficient encoding.

Any kind of 3-D model can be used, e.g. wireframe or VRML models, voxel maps (such as MRI images), hierarchical voxel maps (octree models), or collections of 2D objects (e.g. as used in MPEG-4). Besides natural content, the 3-D model can also contain synthetic content (computer graphics).

To ensure compatibility with conventional monoscopic systems, a special 3-D model can be used that consists of a normal monoscopic image plus an additional sublayer with geometric information. The latter can e.g. be a special image that contains the depth z for every pixel (or 1/z called disparity, or a derived quantity such as the disparity derivative). This image is particularly interesting as it is currently the only actual 3-D model that can be acquired directly (without processing) by a so-called range camera. It can also be generated by processing stereoscopic image material. The geometric sublayer can be absent to provide full backwards compatibility at the content creation side. In the context of the 3-D model, the normal monoscopic image is then assumed to represent a flat 3-D model. In this way, the image can still be used as a basis to render other images efficiently via the image enhancement information.

The image enhancement information enables the quality upgrading of a specific set of images (viewpoints) rendered from the 3-D model. The image enhancement information layer can contain several sublayers, each of which may correspond to a single viewpoint or to a discrete or (semi-)continuous range of viewpoints. The range sublayers enable motion parallax (i.e. the seemingly different speed of movement of nearby and far away objects that a moving viewer experiences: nearby objects seem to move faster than objects that are far away), where a 1-D range enables horizontal motion parallax. For the 3-D evolution scenario, a 2-D range sublayer may be included. Such a range is important as it contains all visual 3-D information in a scene (a hologram is equivalent with a 2-D viewpoint range with extremely high image resolution). Possibly for some application, a multidimensional range (e.g. for xyz camera position, $\alpha\beta\gamma$ orientation and f zoom) can be of use, although such a range cannot contain more information than the 2-D viewpoint range by definition.

For natural content, the sublayers would normally correspond to the original cameras used for recording. The sublayers can also be used for adding special effects such as fog or smoke, e.g. for synthetic content.

The actual method of image enhancement can be anything. A good candidate is to include in the image enhancement information the difference (error) between an original image and the appropriate rendering from the 3-D model. At the receiver, the rendered image plus the difference image will then result in the original image, regardless of any error made in the 3-D model layer.

The image enhancement information can be encoded using e.g. DCT transforms and lossless or lossy coefficient coding. This method is also used in MPEG-2 and MPEG-4 to upgrade images after they have been constructed by copying parts from previously decoded images. For single viewpoints that are close to each other, the inter-dependencies (cross-correlation) between their images can also be used in the encoding process. This is of importance for the range of viewpoints, where the correlation is very high within the range.

The visual communication signal according to the invention has the following characteristics:

It serves a wide range of different acquisition and display devices;

It enables high-quality transmission, regardless of the state of the art in image processing, whenever acquisition and display devices share the same modality, or when the display only uses part of the data from the acquisition device, such as a conventional monoscopic display;

Whenever acquisition and display devices have different modality, transmission is still possible, while the quality depends on the state of the art in image processing.

In this way, a successful start can be made with 2-D compatible, high-quality 3-D television, while an evolutionary scenario is enabled, both in devices and processing technology.

It is to be noted that other visual communication signals for solving the 3-D television challenge have been proposed:

Use of a base-layer containing a single image and an enhancement layer containing image enhancement information relating to that single image (as used in the MPEG-2 Multiview Profile (MVP) system).

Use of a specific image-based visual communication signal, e.g. stereo material. This results in high-quality 3-D images, but also in a limitation on the use of different display devices (only stereo displays can be used).

Use of a 3-D model without image enhancement information, e.g. only the 'image+depth' 3-D model or the VRML/octree 3-D model or the light field model as disclosed in the above mentioned paper. This results in degraded image quality due to the state of the art in image analysis techniques.

An embodiment of the visual communication signal according to the invention is characterized in that the image enhancement information corresponding to a single 3-D image relates to substantially the whole single 3-D image. By applying the image enhancement information to the entire 3-D image problems in reconstructing images in which a transparent foreground object is present can be avoided. Such problems do occur when the image enhancement information only fills the holes in the renderings. For example, the 'image+depth' 3-D model puts limitations on the represented topology. Whenever images are rendered from a viewpoint that differs substantially from the original image, holes appear in the rendering. This 'hole filling' enhancement approach accounts only locally in the images for the holes, but not for the image/signal processing problems which occur always throughout the entire images.

Possible applications of the inventive concept include the following:

Monoscopic TV is enabled by only transmitting a normal image. This image is contained in the 3-D model layer, where the 'image+depth' type 3-D model is used without the depth image.

High-quality stereoscopic imagery is enabled by using two sublayers with a single viewpoint, or only one in combination with the normal image from the 'image+depth' 3-D model.

Multiview displays such as the Philips' 3D-LCD can be served by a number of single viewpoint sublayers, or with only one discrete range of viewpoints sublayer. This latter sublayer is of importance for future displays that may support as many as 100 viewpoints, providing an almost continuous range of 3-D viewpoints on a scene. The 2-D range of viewpoints will become important for future displays that show a scene with exact 3-D geometry without any distortion and with full motion parallax.

Manual viewpoint selection by a user, e.g. by means of a TV remote control, can be enabled by manually browsing the viewpoint sublayers.

The visual communication system according to the invention is arranged for transmitting the visual communication signal according to the invention from a transmitter to a receiver. Such visual communication systems include 3-D television, teleconferencing and remote surgery systems.

The tangible medium according to the invention is arranged for carrying the visual communication signal according to the invention. The visual communication signal according to the invention may be stored on a suitable information carrier such as a hard disc, a CD-ROM, a DVD-ROM or the like.

The visual communication signal according to the invention may be (included in) a MPEG video stream carrying the image model information and the image enhancement information as private or user data or in a separate PID. Alternatively, the visual communication signal may be transmitted over the Internet in order to facilitate Internet TV.

Figure 2:
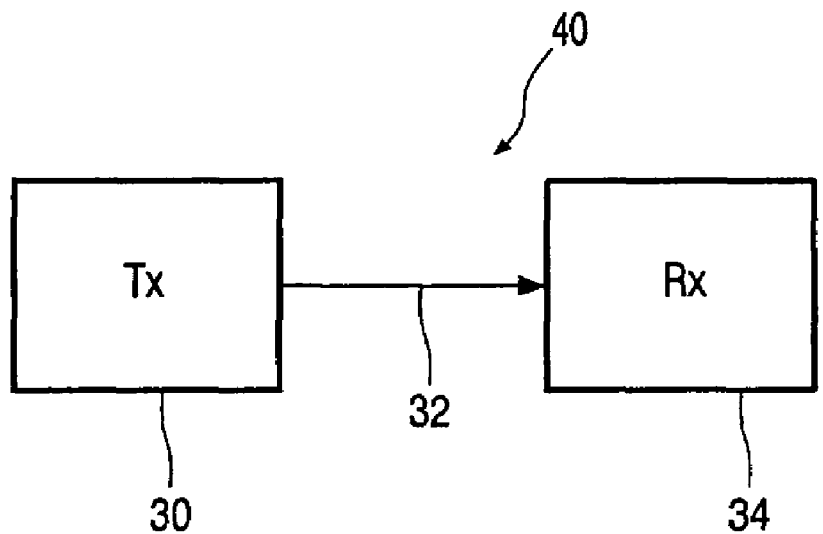
Figure 3:
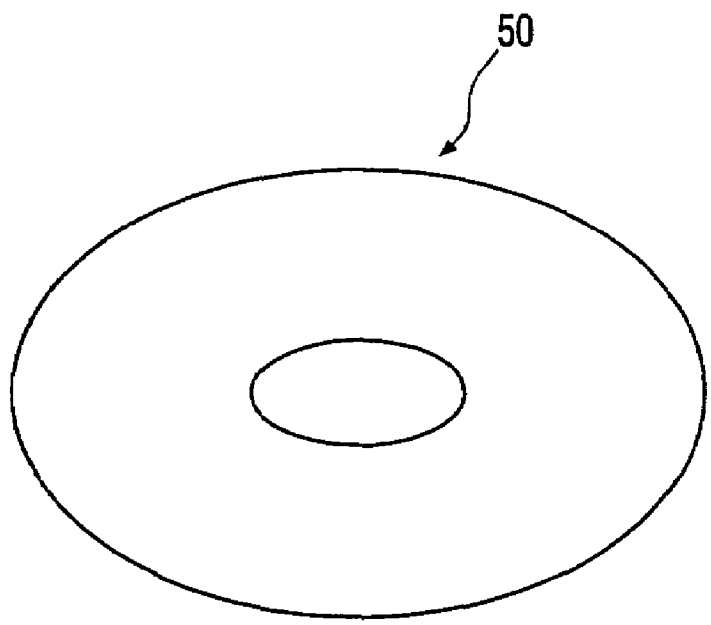
Figure 4:
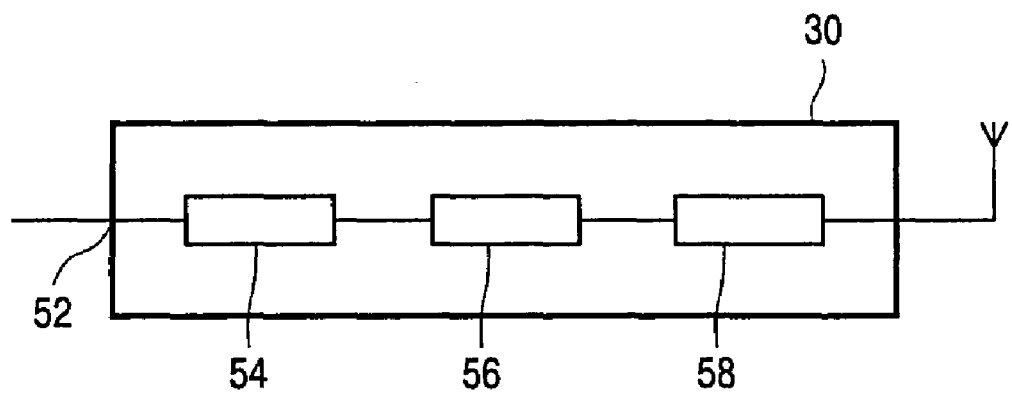
Figure 5:
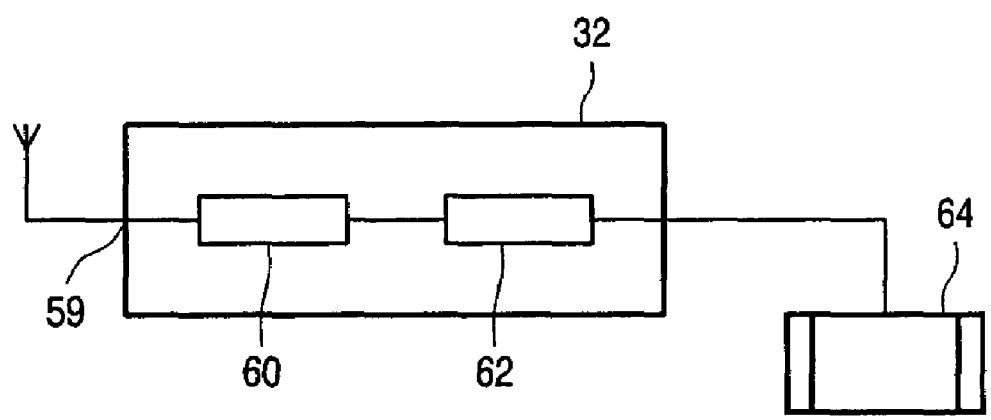

The above object and features of the present invention will be more apparent from the following description of the preferred embodiments with reference to the drawings, wherein:

FIG. 1 shows diagrammatically several embodiments of the visual communication signal 32 according to the invention, FIG. 2 shows a block diagram of an embodiment of the visual communication system 40 according to the invention, FIG. 3 shows an embodiment of the tangible medium 50 according to the invention, FIG. 4 schematically shows the most important elements of a transmitter according to the invention and FIG. 5 schematically shows the most important elements of a receiver according to the invention.

In the Figures, identical parts are provided with the same reference numbers.

FIG. 1 shows diagrammatically several possible embodiments of the visual communication signal 32 according to the invention. The visual communication signal 32 comprises image model information in a 3-D model layer 10 and image enhancement information in an image enhancement layer 20. From the image model information, (3-D) images can be rendered from any arbitrary viewpoint. This ensures that at any time in the evolution scenario, any display can be used (monoscopic, stereoscopic, multiview displays). The image enhancement information ensures that a specific set of viewpoints, those that were originally recorded to generate the 3-D image model, can be rendered without artefacts.

The image model information (or 3-D model) is the result of the analysis processing of all or almost all data from the acquisition device. For example, a 50 camera acquisition device still results in a single 3-D model. As the latter in general contains fewer information bits, the 3-D model can be used for efficient encoding.

The 3-D model layer 10 may comprise one or more 3-D models such as a wireframe or VRML model 14, a voxel map (such as MRI images) or hierarchical voxel map (octree model) 18, or collections of 2-D objects 16 (e.g. as used in MPEG-4). Besides natural content, the 3-D model can also contain synthetic content (computer graphics).

To ensure compatibility with conventional monoscopic systems, a special 3-D model 12 can be used that consists of a normal monoscopic image plus an additional sublayer with geometric information. The latter can e.g. be a special image that contains the depth z for every pixel (or 1/z called disparity, or a derived quantity such as the disparity derivative). This image is particularly interesting as it is currently the only actual 3-D model that can be acquired directly (without processing) by a so-called range camera. It can also be generated by processing stereoscopic image material. The geometric sublayer can be absent to provide full backwards compatibility at the content creation side. In the context of the 3-D model, the normal monoscopic image is then assumed to represent a flat 3-D model. In this way, the image can still be used as a basis to render other images efficiently via the image enhancement information.

The image enhancement information enables the quality upgrading of a specific set of images (viewpoints) rendered from the 3-D model. The image enhancement information layer 20 can contain one or more sublayers 22 . . . 28, each of which may correspond to a single viewpoint 22, 24 or to a discrete or (semi-) continuous range of viewpoints 26, 28. The range sublayers 26, 28 enable motion parallax (i.e. the seemingly different speed of movement of nearby and far away objects that a moving viewer experiences: nearby objects seem to move faster than objects that are far away), where a 1-D range 26 enables horizontal motion parallax. For the 3-D evolution scenario, a 2-D range sublayer 28 may be included. Such a range is important as it contains all visual 3-D information in a scene (a hologram is equivalent with a 2-D viewpoint range with extremely high image resolution). Possibly for some application, a multidimensional range (e.g. for xyz camera position, $\alpha\beta\gamma$ orientation and f zoom) can be of use, although such a range cannot contain more information than the 2-D viewpoint range by definition.

For natural content, the sublayers would normally correspond to the original cameras used for recording. The sublayers can also be used for adding special effects such as fog or smoke, e.g. for synthetic content.

The actual method of image enhancement can be anything. A good candidate is to include in the image enhancement information the difference (error) between an original image and the appropriate rendering from the 3-D model. At the receiver, the rendered image plus the difference image will then result in the original image, regardless of any error made in the 3-D model layer.

The image enhancement information can be encoded using e.g. DCT transforms and lossless or lossy coefficient coding. This method is also used in MPEG-2 and MPEG-4 to upgrade images after they have been constructed by copying parts from previously decoded images. For single viewpoints that are close to each other, the interdependencies (cross-correlation) between their images can also be used in the encoding process. This is vital for the range of viewpoints, where the correlation is very high within the range.

FIG. 2 shows a block diagram of an embodiment of the visual communication system 40 according to the invention, which visual communication system 40 may be a 3-D television system, a 3-D teleconferencing system, a remote surgery system or a Internet TV system. The visual communication system 40 comprises a transmitter 30 and a receiver 34. The visual communication system 40 may comprise further transmitters 30 and receivers 34. A visual communication signal 32 is transmitted by the transmitter 30 and received by the receiver 34. The transmitter 30 may be a headend of a CATV network or a satellite television system or a terrestrial television network. The transmitter 30 may broadcast pre-recorded or live 3-D television programs to 3-D television receivers 34. Alternatively, the receiver 34 is a PC having a display for displaying 3-D images and receiving the visual communication signal 32 via the Internet. In the case of a 3-D teleconferencing system, both ends of the connection have a combined transmitter 30/receiver 34 and the visual communication signal 32 is transmitted in both directions.

FIG. 3 shows a DVD-ROM 50 as a possible embodiment of the tangible medium 50 according to the invention. This DVD-ROM 50 is arranged for carrying the visual communication signal according to the invention. The visual communication signal according to the invention may alternatively be stored on any suitable information carrier such as a hard disc or a CD-ROM or the like.

FIG. 4 schematically shows the most important elements of a transmitter according to the invention. The transmitter 30 may obtain image data relating to the signal to be transmitted, from an external source through an input 52. The transmitter has an inclusion unit 54 that includes an image model 10 for 3-D images as described above into the signal to be transmitted. Furthermore, the transmitter has an enhancement unit 56 that includes image enhancement information 20 as described above. Finally, the transmitter has an output unit 58 that outputs the visual communication, e.g. to an antenna in the case of a broadcasting transmitter or to a cable network in the case of a cable headend.

FIG. 5 schematically shows the most important elements of a receiver according to the invention. The receiver 32 has an input 59 where the visual signal enters the receiver. The signal may be captured in different ways. It may for example be via an antenna if the signal is broadcast or via a cable is the signal is transmitted through a cable network. The receiver has a reception unit 60 for receiving the signal and preparing it for further processing. The reception unit could contain a tuner for selecting the appropriate frequency in the case of a broadcast signal. Furthermore, the receiver has an extraction unit 62 for extracting the required information from the signal. As described above, this extracted information can be model information for generating 3-D images, enhancement information for enhancing the 3-D images, enhancement information for 3-D images for a single viewpoint and/or enhancement information for 3-D images for a range of viewpoints. Typically, the receiver will process the signal, while using the extracted information, into an output signal that can be displayed on a display device 64. The display device is suitable for the display of 3-D images and may be based on an of the known technologies for this purpose, e.g. the Philips 3D-LCD.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

The invention claimed is:

1. A method of transmitting a visual communication signal including 3-D video information comprising:
   including a visual communication signal image model information for generating at least 3-D images;
   including a visual communication signal image enhancement information corresponding to at least part of the 3-D images, wherein said image enhancement information includes at least one difference image correcting for error in the image model information; and transmitting the visual communication signal.

2. The method of transmitting a visual communication signal according to claim 1, wherein the image enhancement information corresponding to a single 3-D image relates to substantially the whole single 3-D image.

3. The method of transmitting a visual communication signal according to claim 1, wherein the image enhancement information includes image information corresponding to a single viewpoint.

4. The method of transmitting a visual communication signal according to claim 1, wherein the image enhancement information includes image information corresponding to a range of viewpoints.

5. A visual communication system for transmitting the visual communication signal according to the method of claim 1 from a transmitter to a receiver.

6. A transmitter for transmitting a visual communication signal, the transmitter comprising:
- an inclusion unit for including in the visual communication signal image model information for generating 3-D images;
- an output unit for outputting the visual communication signal; and
- an enhancement unit for including in the visual communication signal image enhancement information corresponding to at least part of the 3-D images, wherein said image enhancement information includes at least one difference image correcting for error in the image model information.

7. The transmitter according to claim 6, wherein the enhancement unit includes in the visual communication signal the image enhancement information corresponding to a single 3-D image, whereby the enhancement information relates to substantially the whole 3-D image.

8. The transmitter according to claim 6, wherein the enhancement information includes image information corresponding to a single viewpoint.

9. The transmitter according to claim 6, wherein the enhancement information includes image information corresponding to a range of viewpoints.

10. A receiver for receiving a visual communication signal, the receiver comprising:
- a reception unit for receiving the visual communication signal, and
- an extraction unit for extracting from the visual communication signal image model information for generating 3-D images, and extracting from the visual communication signal image enhancement information corresponding to at least part of the 3-D images, wherein said image enhancement information includes at least one difference image correcting for error in the image model information.

11. The receiver according to claim 10, wherein the extraction unit for extracting from the visual communication signal the image enhancement information corresponding to a single 3-D image, whereby the enhancement information relates to substantially the whole 3-D image.

12. The receiver according to claim 10, wherein the enhancement information includes image information corresponding to a single viewpoint.

13. The receiver according to claim 10, wherein the enhancement information includes image information corresponding to a range of viewpoints.

14. A tangible medium for carrying the visual communication signal according to the method of claim 1.

15. The method according to claim 1, wherein the method includes transmitting the visual communication signal from a transmitter to a receiver.

16. The tangible medium according to claim 14, wherein said tangible medium is a computer-readable medium.

17. The tangible medium according to claim 14, wherein said tangible medium is an optical disc or a hard disc.

18. The tangible medium according to claim 14, wherein said tangible medium is a CD-ROM or a DVD-ROM.

* * * * *